United States Patent [19]
Ade et al.

[11] Patent Number: 5,347,601
[45] Date of Patent: Sep. 13, 1994

[54] INTEGRATED OPTICAL RECEIVER/TRANSMITTER

[75] Inventors: Robert W. Ade, Bolton; Donald E. Bossi, South Windsor, both of Conn.

[73] Assignee: United Technologies Corporation, Hartford, Conn.

[21] Appl. No.: 37,863

[22] Filed: Mar. 29, 1993

[51] Int. Cl.$^5$ .............................................. G02B 6/10
[52] U.S. Cl. .................................... 385/3; 385/14; 385/9; 385/24; 385/40; 385/41; 385/45; 385/4; 359/152; 359/173
[58] Field of Search .......................... 385/1–3, 385/14, 4, 8, 9, 24, 40, 41, 42, 45, 50, 129, 130, 131; 359/152, 153, 154, 163, 173, 179, 188, 195

[56] References Cited

U.S. PATENT DOCUMENTS

| | | | |
|---|---|---|---|
| 4,002,997 | 1/1977 | Thompson | 385/2 |
| 4,989,934 | 2/1991 | Zavracky et al. | 385/14 |
| 5,078,511 | 1/1992 | Noll et al. | 385/3 |
| 5,107,310 | 4/1992 | Grudkowski et al. | 257/241 |
| 5,119,447 | 6/1992 | Trisno | 385/3 |
| 5,144,637 | 9/1992 | Koch et al. | 372/50 |
| 5,148,503 | 9/1992 | Skeie | 385/3 |
| 5,230,028 | 7/1993 | Lin et al. | 385/3 |

OTHER PUBLICATIONS

Monolithic Integration of a 3-GHz Detector/Preamplifier Using a Refractory Gate, Ion-Implanted MESFET Process (Dennis L. Rogers, IEEE Electronics Device Letters, vol. EDL-7, No. 11; Nov. 1986).
Integration of GaAs MESFET Drivers With GaAs Directional-Coupler Electro-optic Modulators (J. H. Abeles et al; Electronic Letters, vol. 23, No. 20; Sep. 1987).
Monolithic Integration of Singlemode AlGaAs Optical Waveguide at 830nm With GaAs E/D-MESFETs Using Planar Multifunctional Epistructure (PME) Approach (S. D. Mukherjee et al, Electronic Letters, vol. 27, No. 24; Nov. 1991).
Monolithic Integration of GaAs-Waveguide Optical Intensity Modulator With MESFET Drive Electronics (R. W. Ade et al; Electronics Letters, vol. 28, No. 8; Apr. 1992).

*Primary Examiner*—Frank Gonzalez
*Attorney, Agent, or Firm*—Gerald L. DePardo

[57] ABSTRACT

An integrated optical receiver/transmitter (transceiver) 8 has continuous wave (cw) light 16 that enters a Mach-Zehnder optical modulator 10 controlled by a modulator control circuit 12 that provides modulated light 30 along a waveguide 32 to an optical coupler 34 which couples a predetermined portion of the light 30 to a waveguide 44 as light 42 which then exits the transceiver from a port 46. Receive light 90 is accepted at the port 46 and travels along the waveguide 44 to the coupler 34 which couples a predetermined amount of the light 90 to a waveguide 70 as light 92 which is detected by a waveguide-integrated photodetector 72. The photodetector 72 provides a current signal on a line 74 to a receiver circuit 76 which provides a voltage signal indicative of the light 92. Alternatively, the coupler may be passive, thereby not requiring the coupler control circuit, or no coupler at all may be employed and two fibers used for communications with the transceiver 8.

25 Claims, 9 Drawing Sheets

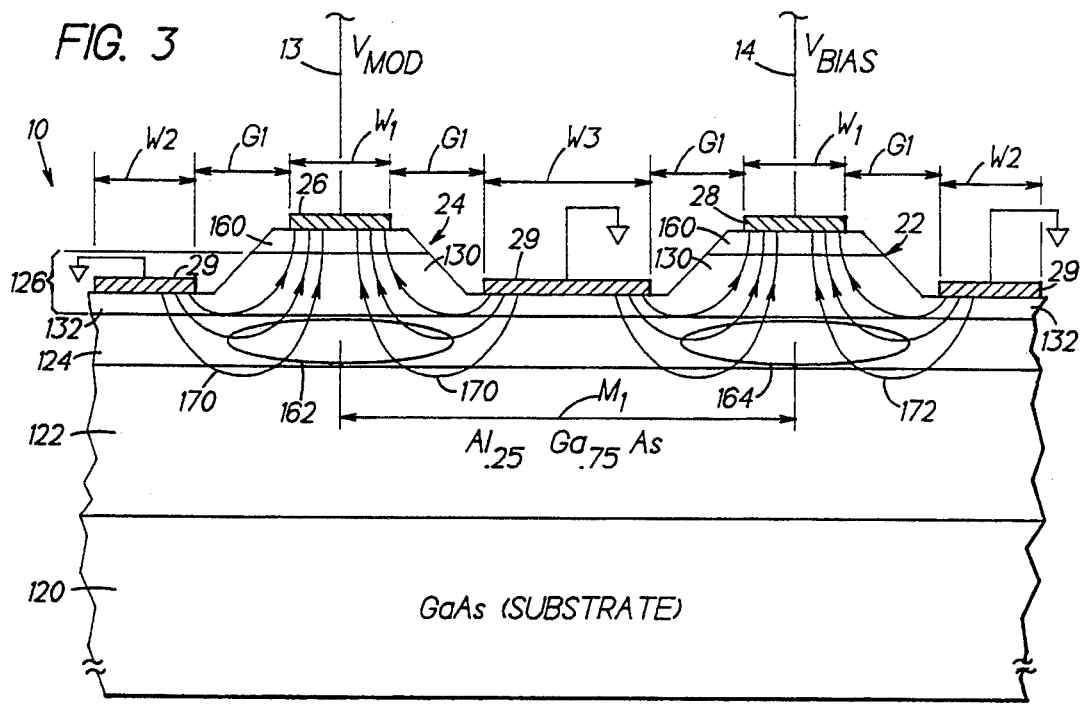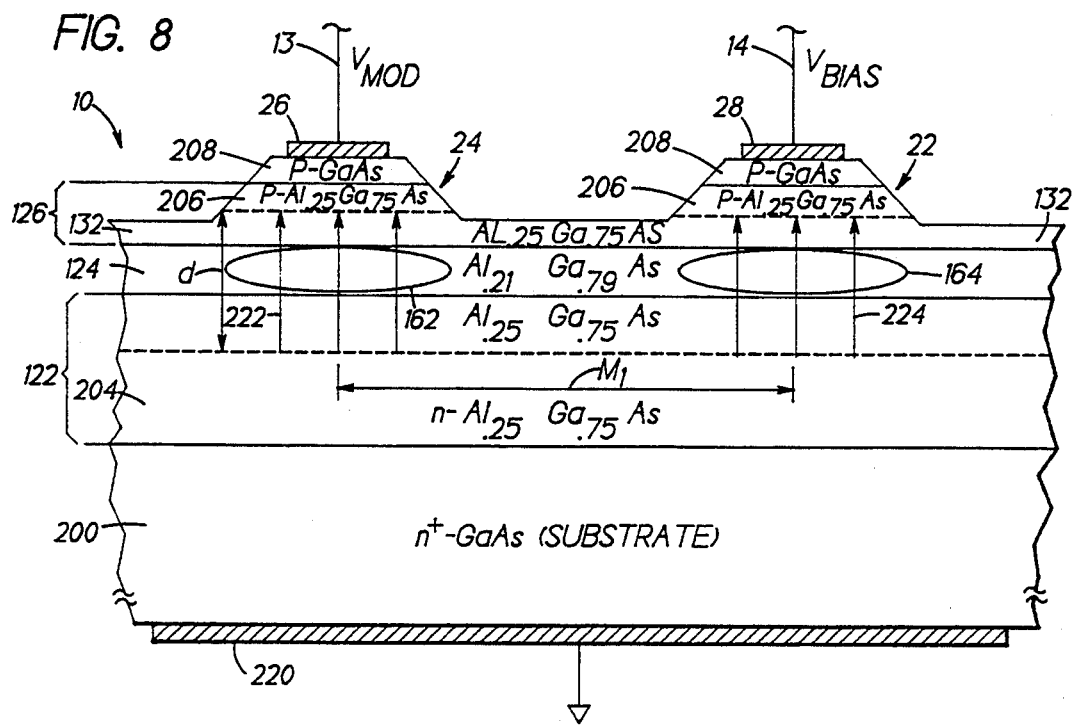

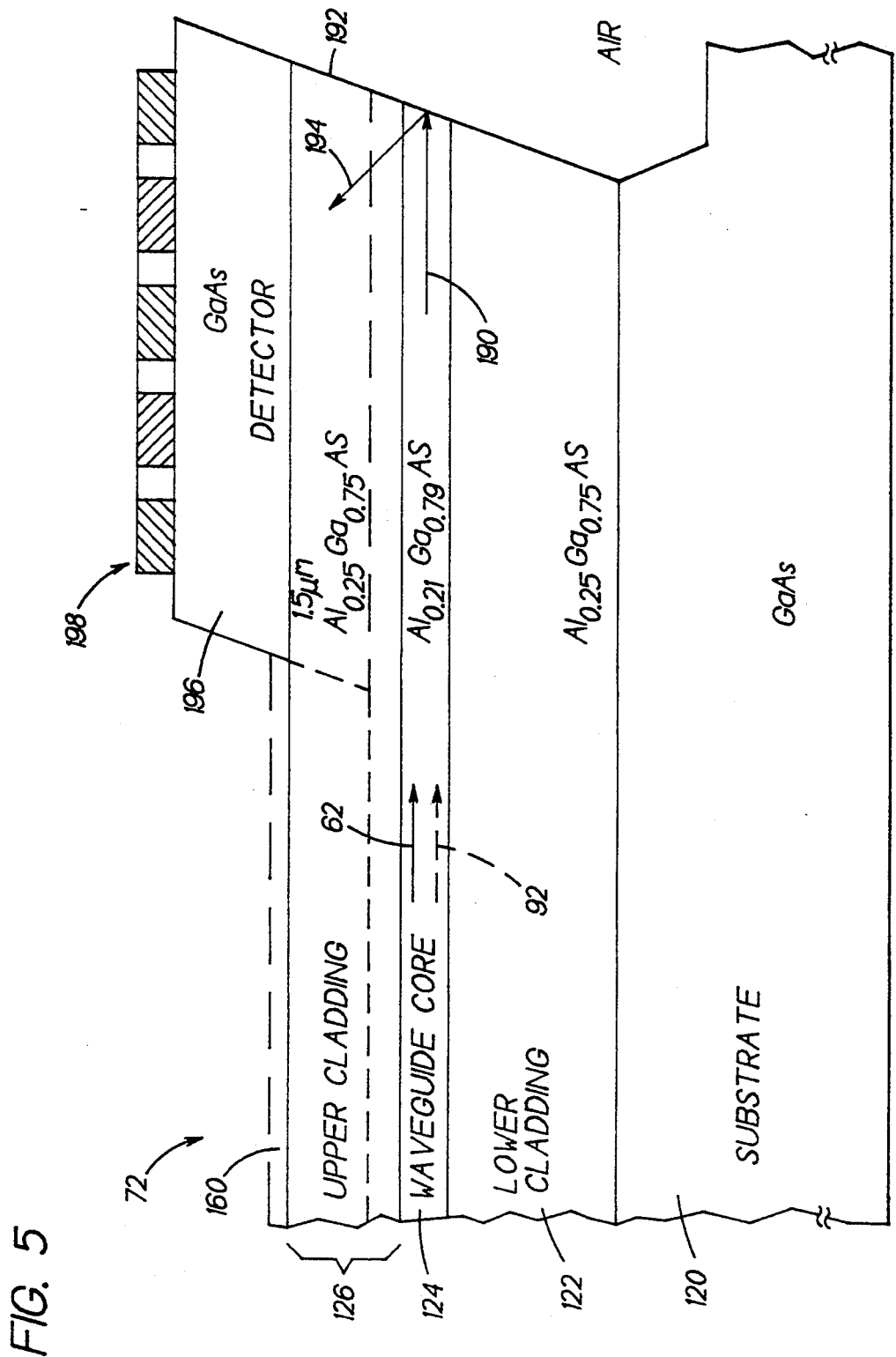

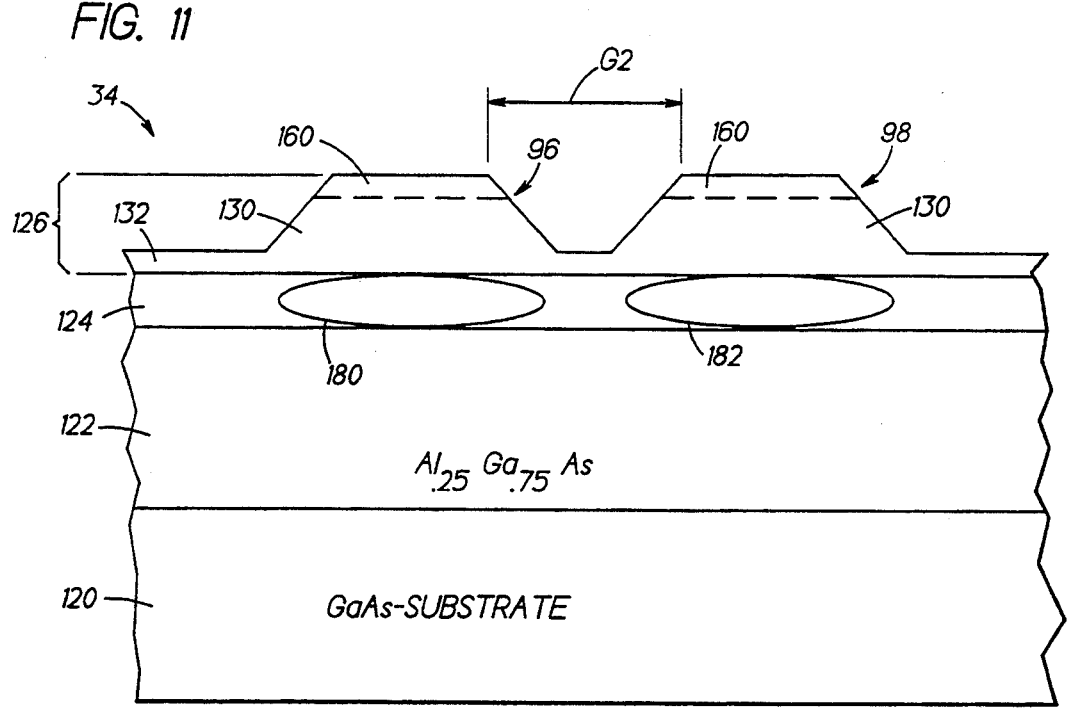
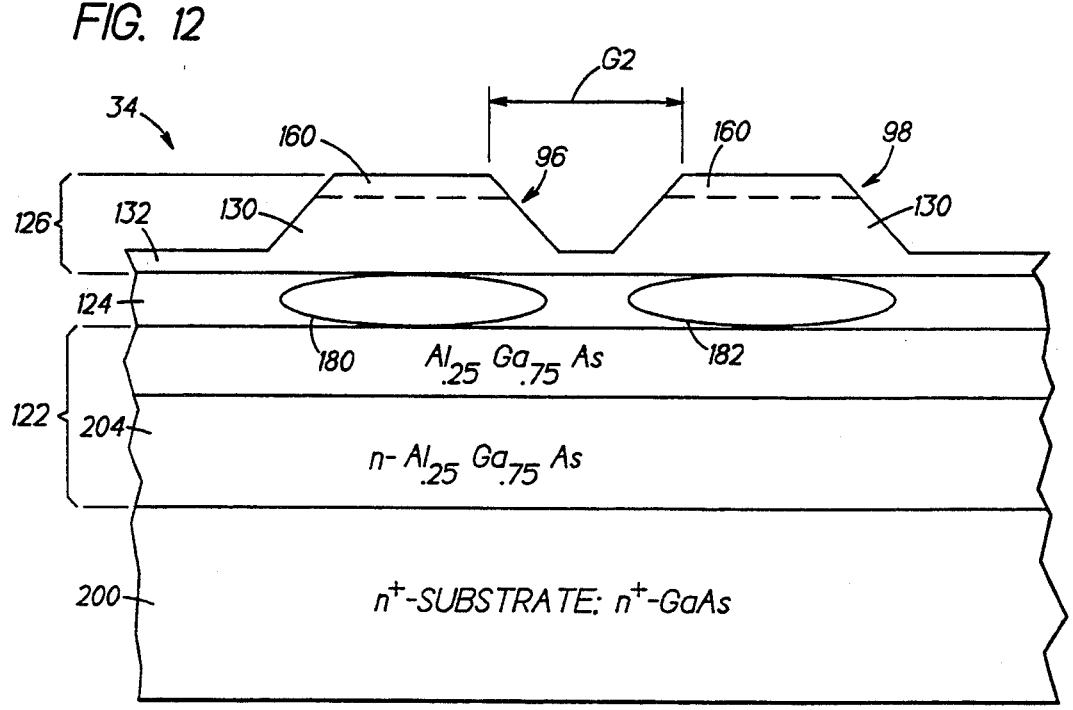

INTEGRATED OPTICAL RECEIVER/TRANSMITTER

CROSS-REFERENCES TO RELATED APPLICATIONS

Copending U.S. patent application, Ser. No. 08/039,807 (still pending), entitled "Single-Side Growth Reflection-Based Waveguide-Integrated Photodetector", filed contemporaneously herewith, contains subject matter related to that disclosed herein as is hereby incorporated by reference.

TECHNICAL FIELD

This invention relates to waveguide based optical detectors (receivers) and modulators (transmitters), and more particularly to an optical device serving as both an optical transmitter and receiver on one common substrate.

BACKGROUND ART

An optical detector (or receiver), as is known, is a device which detects the intensity of incident light and provides an electrical signal indicative thereof. Also, an optical modulator (or transmitter) is a device which receives light and provides modulated (or varied) output light by varying an input electrical signal.

Prior art devices do not provide both a detector and a modulator on a single device that also provides bidirectional single fiber optic communications. Instead, two separate fibers must be used to convert an electronic transmit signal to an optical transmit signal, and to convert a received optical signal to an electronic signal.

One common waveguide-integrated optical detector in the art is a leakage-based detector or "evanescent-coupling" detector. In a leakage-based detector, input light is guided along a waveguide (i.e., waveguide layers, having a lower cladding layer and a core layer) located on the device, and a detector layer made of a material having an energy bandgap smaller than that of the energy of the light being detected, is grown adjacent to the core of the waveguide. Light propagating along the waveguide core layer leaks into the detector layer and, because the energy of the light is greater than the bandgap of the detector layer, is absorbed thereby. Such absorption generates electron hole pairs therein which are detected (or collected) by electrodes disposed on the surface of the detection layer, as is known.

However, the leakage-based detector design may not also be integrated with a modulator on the same chip because if electrodes are disposed on the surface of the waveguide core (as is the detector layer) to modulate the light in the waveguide, the electrodes absorb the light in the waveguide, thereby greatly attenuating the light intensity in the waveguide.

Also, requiring a separate device for both receive and transmit precludes bidirectional communications on a single fiber fed directly to the interface chip. Instead, the fiber from the transmitter must be coupled to the fiber from the receiver, requiring more parts and expense.

Thus, it would be desirable to design a combined optical modulator (transmitter) and detector (receiver) on a single chip/substrate (i.e., a transceiver). It would also be desirable to incorporate electronics to control both the modulator and detector on the same chip.

DISCLOSURE OF THE INVENTION

Objects of the invention include provision of an integrated optical receiver/transmitter which has both a detector and a modulator on the same chip.

According to the present invention, an integrated optical receiver/transmitter (transceiver) employs a substrate made from a III–V category semiconductor material; a waveguide-modulator is fabricated above the substrate, is responsive to a modulation signal, receives input light, and provides a modulated transmit light along a first integrated rib (or channel) waveguide; a waveguide-integrated photodetector is fabricated above the substrate to detect receive light propagating along a second integrated rib waveguide and to provide a receive signal indicative of the intensity of the receive light.

According further to the present invention, a coupler fabricated above the substrate couples a predetermined portion of the transmit light to a third rib waveguide and for coupling a predetermined portion of the receive light from the third rib waveguide to the second rib waveguide.

According still further to the invention the coupler couples a remaining portion of the transmit light to a fourth rib waveguide as a built-in-test light; the built-in-test light reflects off a reflective surface in the fourth waveguide and reenters the coupler which couples a predetermined portion of the built-in-test light to the second rib waveguide.

In still further accord to the invention, transistors are fabricated on a GaAs layer above the substrate to make up at least one control circuit. Further in accord to the invention, the substrate is made of GaAs.

The invention represents a significant breakthrough in the area of optoelectronic transceivers. The invention allows bidirectional communications along a single fiber fed directly to a transceiver chip. Thus, the invention provides a single integrated circuit chip for use in bidirectional optical communications. The invention provides this capability in a single growth process, without requiring any regrowth techniques to fabricate the photodetector. Further, the invention will work with light at wavelengths near 0.8 microns (popular in short distance communications applications) as well as 1.3–1.55 microns (popular in long distance telecommunications applications).

Such applications include: optical bidirectional serial data to electronic serial or parallel data conversion for interfacing with computers, e.g., modems or coder/decoders (CODECs) for high data rate digital transmission of data, voice, and video signals; optical remote terminal interface (RTI) for optical MIL STD 1773 or optical ARINC 629 bidirectional digital optical serial communications buses; and analog optical communication of microwave RADAR, Cable TV, phased array RADAR, Cable TV distribution, antenna remoting, or telephone signals.

Also, the invention has on-chip electronics to control modulation, reception and/or coupling, thereby providing an optoelectronic integrated circuit (OEIC) transceiver. Further, by using an on-chip electro-optic modulator the invention allows a higher power and more linear transmission at high frequencies than by directly modulating current through a laser diode. Furthermore, the invention allows for simultaneous data transmission and reception.

The foregoing and other objects, features and advantages of the present invention will become more apparent in light of the following detailed description of exemplary embodiments thereof as illustrated in the accompanying drawings.

BRIEF DESCRIPTION OF DRAWINGS

FIG. 3 is a lateral cross-section cut-away view of a modulator for the transceiver of FIG. 1 having a coplanar electrode configuration, in accordance with the present invention.

FIG. 5 is a longitudinal cross-section cut-away of a waveguide-integrated photodetector for the transceiver of FIG. 1, in accordance with the present invention.

FIG. 8 is a lateral cross-section cut-away view of an alternative embodiment of the modulator, having a vertical electrode configuration, in accordance with the present invention.

FIG. 11 is a lateral cross-section cut-away view of a passive coupler for the transceiver of FIG. 1, in accordance with the present invention.

FIG. 12 is a lateral cross-section cut-away view of the passive coupler for an alternative embodiment, in accordance with the present invention.

BEST MODE FOR CARRYING OUT THE INVENTION

Figure 1:
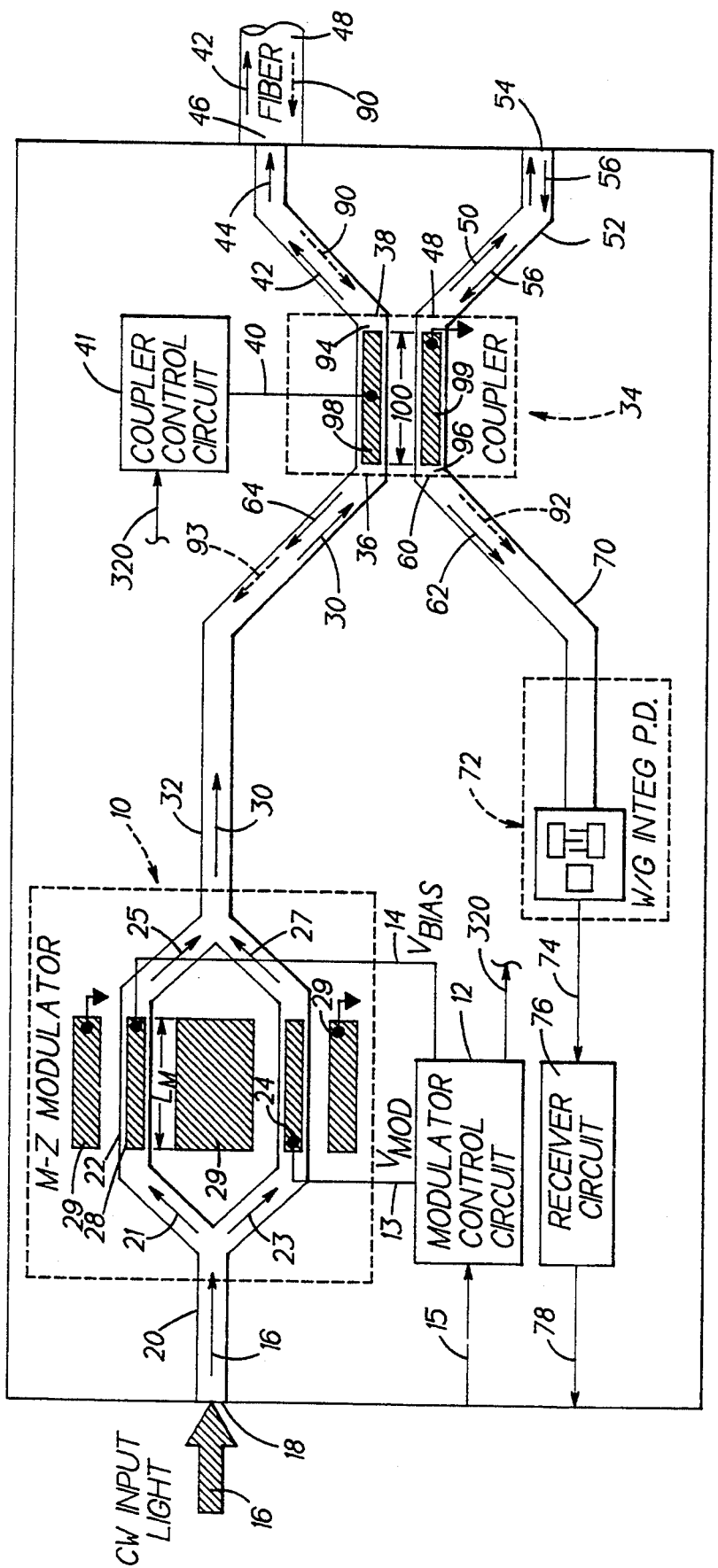
FIG. 1 is a top view of a optical-electronic integrated circuit transceiver, in accordance with the present invention.

Referring now to FIG. 1, an integrated optical receiver/transmitter (transceiver) 8 includes a waveguide-modulator (transmitter) 10, e.g., an electro-optic Mach-Zehnder waveguide-modulator (discussed hereinafter) driven by a modulator control circuit 12 (discussed hereinafter) on lines 13,14 in response to an input signal on a line 15 from off the transceiver chip. In general, a waveguide-modulator is a modulator made from waveguides, as is known.

The Mach-Zehnder waveguide-modulator 10 receives continuous wave (cw) input light 16 from an external source, e.g., a laser (not shown). The light 16 enters the device at an input port 18 and travels along a strip loaded waveguide 20, similar to that described in Copending U.S. patent application Ser. No. 08/039,807, entitled "Single-Side Growth Reflection-Based Waveguide-Integrated Photodetector", filed contemporaneously herewith, to the modulator 10. Light other than cw light may be used for the input light 16 if desired, e.g., modulated light.

The Mach-Zehnder modulator 10, as is known, splits the incoming light 16 evenly into two light waves 21,23 each traveling along one of a pair of parallel phase modulating waveguide arms 22,24, respectively. The light 23, traveling along the arm 24, is phase modulated by a modulating voltage $V_{mod}$ applied on the line 13 to an electrode 26 on the waveguide arm 24 from the modulator circuit 12. The light 21, traveling along the other arm 22, is phase shifted by a DC voltage $V_{bias}$ applied on the line 14 to an electrode 28 at a desired operating point around which modulation is performed.

Electrodes 29 are grounded to provide a difference in potential across the arms 22,24 of the modulator 10 that generates an electric field that allows modulation to occur (discussed hereinafter). The modulator 10 modulates light over a modulation length $L_m$, e.g., 6–8 mm providing phase modulated light waves 25,27 from the arms 22,24, respectively. Other modulator lengths may be used if desired. The light waves 25,27 are recombined to form a modulated optical signal 30. The modulated optical signal 30 travels along a rib (or channel) waveguide 32 to a port 36 of an active coupler 34. The terms "rib" waveguide and "channel" waveguide are used as equivalent terms herein.

When the coupler 34 is in a first (or "bar") state, it couples a predetermined percentage (e.g., 75%) of the modulated light 30 to a port 38, in response to a coupler signal on a line 40 (discussed hereinafter) from a coupler control circuit 41, which exits the port 38 as coupled modulated light 42. The light 42 from the port 38 travels along a rib waveguide 44 to a transceiver output port 46 where the light 42 is transmitted from (exits) the transceiver. An optical fiber 48 is attached to the output port 46 in a known way and allows the coupled modulated (transmit) light 42 to propagate to a distant location from the transceiver.

The remaining portion (25%) of the light 30 exits from a port 48 of the coupler 34 indicated by a line 50 and travels along a rib waveguide 52 and is reflected off a surface 54 of the structure as reflected light 56. The reflected light 56 enters the coupler 34 at the port 48 and couples a predetermined percentage (e.g., 75%) of the light 56 to a port 60 which exits as light 62, and couples the remaining portion (25%) of the light 56 to the port 36 that exits as light 64.

To prevent the light 64 from affecting the cw laser light source (not shown) after it exits from the port 18, the light source may have an optical isolator built into its output to prevent unwanted light from reentering the light source. For example, a laser with a fiber pigtail containing an optical fiber isolator may be used.

The light 62 from the port 60 of the coupler 34 travels along a rib waveguide 70 to a waveguide-integrated optical detector (or photodetector) 72, similar to that described in aforementioned copending U.S. Patent Application. The optical detector 72 provides electrical signals on a line 74 to a receiver circuit 76 (similar to that described in the aforementioned copending U.S. Patent Application) which provides a signal on a line 78, related to the intensity of the light 62 entering the detector 72. The line 78 interfaces with other circuitry off the transceiver.

Receive light 90 traveling along the optical fiber 48 enters the transceiver 8 at the port 46 and travels along the rib waveguide 44 to the port 38 of the coupler 34. When the coupler 34 is operating in a second (or "cross") state, the coupler 34, couples a predetermined percentage (e.g., 75%) of the light 90 from the port 38 "across" to the port 60, in response to the coupler signal on the line 40 (discussed hereinafter), which exits as light 92. The light 90 travels along the rib waveguide 70 to the optical detector 72 which provides signals having a magnitude indicative of the light 92 incident thereon, on the line 74 to the receiver circuit 76. The remaining portion (25%) of the light 90 is coupled to the port 36 and exits as a line 93.

More specifically, the coupler 34 couples a predetermined percentage of light from a first waveguide 94 to a second waveguide 96 by applying a predetermined voltage on the line 40 from the coupler control circuit 41 to an electrode 98 disposed on the upper surface of the waveguide 94 and grounding an electrode 99 disposed on the upper surface the waveguide 96 through a line 100 (details of the coupler 34 are discussed hereinafter).

Less than 100% coupling is used to provide the reflected light 56 to allow the photodetector 72 to detect a portion of the transmitted light for built-in-test purposes (i.e. to determine if the modulator and/or coupler are working properly). Other coupling percentages may be used if desired; however, as the coupling approaches 100%, the intensity of the light 56 goes to zero and no feedback is possible. In that case, however, the optical output power from of the transceiver is maximized. Therefore, the exact coupling percentages will vary from one application to another.

Alternatively, instead of terminating the waveguide 52 at the reflecting surface 54, the waveguide 52 may terminate before the edge of the chip and merely allow the built-in-test light 50 to escape without reflection back to the coupler 34. In that case, 100% coupling of the modulator light 30 from the port 36 to the port 38 and of the receive light 90 from the port 38 to the port 60 would likely be used.

Furthermore, alternatively, instead of terminating the waveguide 52 at the reflecting surface 54, the waveguide 52 may be routed around and coupled back into the waveguide 70 using another coupler (not shown) without going back through the coupler 34.

When the transceiver is in a "receive mode" of operation, the active coupler 34 is placed in the "cross" state, thereby allowing the receive light 90 to be received by the optical detector 72. Conversely, when the transceiver is in a "transmit mode" of operation, the coupler 34 is placed in the "bar" state, thereby allowing the modulated light 30 from the modulator 10 to be coupled to the transceiver output port 46.

Figure 2:
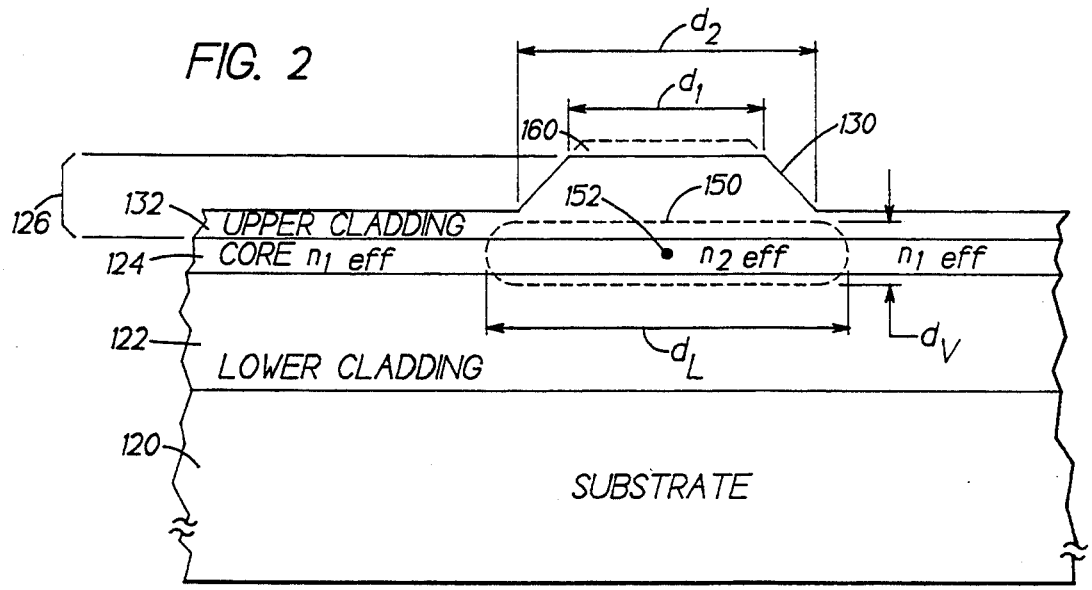
FIG. 2 is a lateral cross-section cut-away view of a rib waveguide structure for the transceiver of FIG. 1, in accordance with the present invention.

Referring now to FIG. 2, the passive rib waveguides 20,32,44,52,70 (FIG. 1) all have a similar structure and use a similar design technique and criteria as that described in the aforementioned copending patent application. The rib waveguides comprise a substrate 120 made of a III-V category semiconductor material, e.g., semi-insulating GaAs, having a thickness of about 500 microns. Substrate materials other than GaAs may be used if desired.

Above the substrate 120 is a lower cladding layer 122 made of not intentionally doped (NID) or intrinsic $Al_{0.25}Ga_{0.75}As$ having a thickness of about 7 microns. Above the lower cladding layer 122 is a waveguide core layer 124 of NID $Al_{.21}Ga_{.79}As$ having a thickness of about 0.7 microns. Above the core layer 124 is an upper cladding layer 126 made of NID $Al_{0.25}Ga_{0.75}As$ having a thickness of about 1.5 microns. A portion of the upper cladding layer 126, is etched away to form a mesa 130 having a height of about 1 micron. A remaining narrow portion 132 of the layer 126, having a thickness of about 0.5 microns, remains unetched above the waveguide core layer 124. Other thicknesses and concentrations of the layers 120,122,124, 126,130,132, may be used if desired, as discussed in the aforementioned copending patent application.

An optical mode 150 has a central point 152 having a maximum intensity, and has a lateral dimension $d_L$ that is determined by the difference between the effective refractive indices $n_{1eff}$ and $n_{2eff}$, which are determined by the dimension $d_2$ of the mesa 130, as discussed in the aforementioned copending patent application. The optical mode 150 also has a vertical dimension $d_V$, which is determined by the concentrations of Al and Ga in the layers 122,124,126 and the thicknesses of the layers 122,124,126, as is also discussed in the aforementioned copending patent application. Also, the number of lateral and vertical modes is determined by these respective parameters, as is also discussed in the aforementioned copending patent application.

Referring now to FIG. 3, a Mach-Zehnder modulator 10 having the electrodes 29,26,28 disposed on the upper surface in a coplanar arrangement, has the same semi-insulating substrate 120, the same lower cladding layer 122, the same waveguide core layer 124, and the same upper cladding layer 126 as the passive rib waveguides of FIG. 2 discussed hereinbefore. However, there is a layer 160 of GaAs having a thickness of about 0.2 microns, which is used to provide a protective layer over the mesa portions 130 of the modulator above the upper cladding layer 126 to improve the contact between the metal electrodes and the semiconductor upper cladding layer 126. The layer 160 is etched down from a thicker layer of GaAs grown for the detector 72 (discussed hereinafter).

Under the waveguide arms 24,22 are optical modes 162,164, respectively, which have vertical and lateral dimensions similar to that discussed hereinbefore for the optical mode 150 (FIG. 2) and are adjusted as discussed in the aforementioned copending patent application. It should be understood that for effective modulation in a Mach-Zehnder modulator, a single mode optical waveguide should be used, as is known.

The electrodes 26,28, are disposed on the upper surface of the straight portions (FIG. 1) of the waveguide arms 24,22 of the modulator 10, respectively. Also, the electrodes 29 are disposed on the upper surface of the narrow portion 132 of the upper cladding layer 126. The electrodes 26,28 are spaced a distance G1, e.g., 4–5 microns, from the electrodes 29 to prevent the electrodes 29 from being too close to, and thus attenuating, the optical modes 162, 164. Also, the width W1 of the electrodes 26,28 is about 4.5 microns each, the width W2 of the two outer-most electrodes of the three electrodes 29 on the outer sides of the mesas 22,24 is about 100 microns or more each, and the width W3 of the center electrode of the three electrodes 29 is about 25 microns. Further, the distance M1 between the center of the waveguides 22,24 of the modulator 10 is about 40 microns to ensure no interaction between the optical modes 162,164 (i.e., no coupling from one arm to the other). The thickness of the electrodes 26,28,29 is about 1.5 microns, and is made to be thicker than the microwave "skin depth" at the desired operating frequency. The electrodes 26,28,29 are deposited prior to etching the mesas of the waveguides 22,24, to allow for accurate placement thereof. Alternatively, the waveguide may be etched first followed by electrode deposition, if desired. Also, the gap G1 and the width W1 set the characteristic impedance Zm, e.g., 50 ohms, of the electrodes 26,28,29 when configured as a microwave transmission line (discussed hereinafter).

The electrode 26 is driven by the modulation signal $V_{mod}$, on the line 13 from the modulation control circuit 12 which creates electric field lines 170 that extend from the electrodes 29 (at ground potential) through the optical mode 162 to the electrode 26. Similarly, the electrode 28 is driven by the bias signal $V_{bias}$, on the line 14 from the modulation control circuit 12 which creates electric field lines 172 that extend from the electrodes 29 (at ground potential) through the optical mode 164 to the electrode 28.

The electric field changes the index of refraction (n) of the material in a known way. This is known as an electro-optic effect. For the lateral electrode configuration of FIG. 3, the value of $\Delta n$ is based on the vertical component of the electric field through the optical modes 162,164 for a waveguide on a (zxy; 100) oriented substrate.

The electric-field-induced refractive index change modifies the optical path length (or velocity) of the light in the waveguide arms 22,24 of modulator 10, thereby changing the phase of the light traveling in a given arm. Depending on the relative phase delay between the two waveguide arms 22,24, the recombined output light 30 (FIG. 1) exhibits a range of maximum (bright) to minimum (dark) intensity from the modulator and varies sinusoidally with the voltage applied, as is known.

The voltage range required on a given arm of the modulator 10 to produce a full range of intensity variation (i.e., a $\pi$ phase shift) on the output light 30 is called a half-wave voltage $V_\pi$. For the lateral electrode configuration of FIG. 3, $V_\pi = 24$ volts. To provide maximum output intensity variation, the modulation should vary around the maximum slope (or inflection) point of the output optical transfer characteristic.

Therefore, $V_{bias}$ is set to $-13$ volts dc and $V_{mod}$ is an ac modulation component with a peak-to-peak (pk—pk) voltage of about 0.5 volts which oscillates around a dc component $V_{dcmod}$ of $-1$ volt. Other voltage levels may be used if desired. Further, because the lateral electrode structure is like a Metal Semiconductor Metal (MSM) diode, and thus behaves like two back-to-back Schottky diodes, there is no concern of forward-biasing a diode junction (because it is not a p-n structure). Thus, the peak-to-peak valve of $V_{dcmod}$ is not constrained by this limitation.

Figure 4:
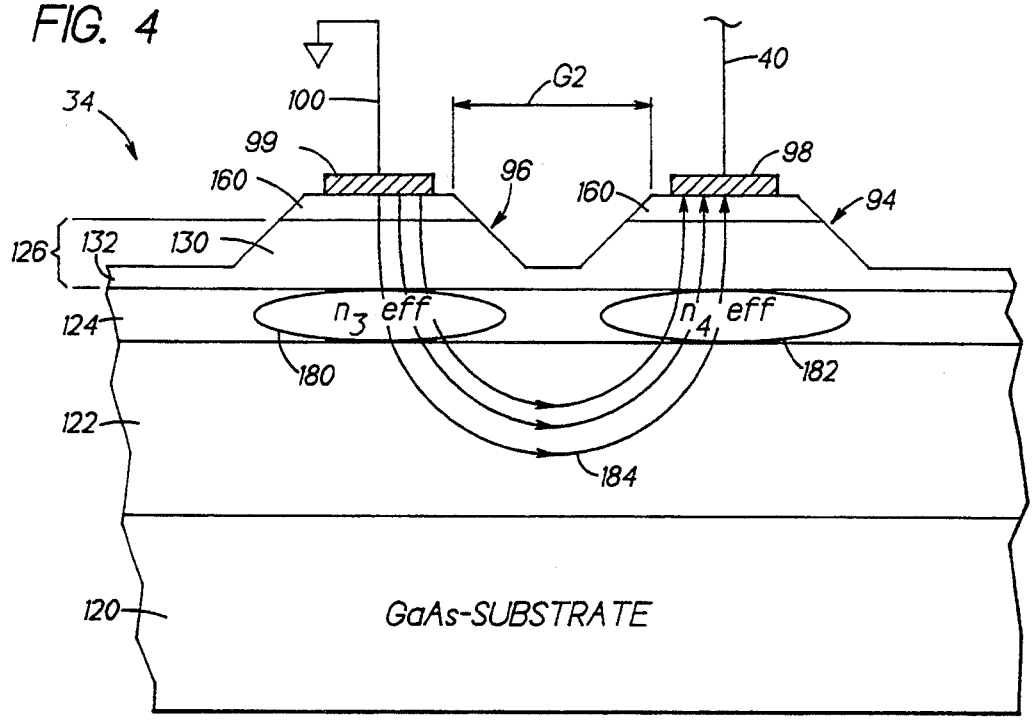
FIG. 4 is a lateral cross-section cut-away view of an active coupler for the transceiver of FIG. 1 having a coplanar electrode structure, in accordance with the present invention.

Referring now to FIG. 4, a coplanar active coupler 34, having the electrodes 98,99 disposed on the upper surface in a coplanar arrangement, has the same semi-insulating substrate 120, the same lower cladding layer 122, the same waveguide core layer 124, the same upper cladding layer 126, and the same protective layer 160 as the modulator of FIG. 3 discussed hereinbefore.

It is known in the art to exchange optical power between modes traveling in adjacent waveguides by the use of waveguide directional couplers. Waveguide directional couplers, as is known, may be used to provide power division, modulation, switching, and other functions. Typically, in a waveguide directional coupler, two optical waveguides are coupled to each other by placing the waveguides close enough to cause overlap between the fringes of the optical fields. For a given optical field overlap, a wave that is initially propagating in one waveguide is transferred to the adjacent waveguide after travelling a predetermined length. Also, the transfer may be controlled electrically by applying an electric field across the mode, which alters the refractive index seen by the mode and thus alters the shape of the mode and the amount of optical field overlap.

A more detailed discussion of directional couplers is provided in "Optical Electronics" by Amnon Yariv, published by Holt, Rinehart, Winston, 3rd Edition, 1985, pp 437-440 and in "Waves and Fields in Optoelectronics" by Hermann A. Haus, published by Prentice Hall, 1984, pp 217-223.

More specifically, the modes 180,182 represent the full-width-half-max point on the optical intensity profile as discussed in FIG. 4 and the accompanying text of the aforementioned copending patent application; thus, optical fringes extend beyond the sketched oval optical modes 180,182. The two waveguides 96,94 are spaced a distance G2, e.g., about 5 microns, so as to cause optical fringes (not shown) of the optical mode 180 in the waveguide 96 to overlap optical fringes (not shown) of the mode 182 in the waveguide 94 when no voltage (0 volts) is applied to the electrode 98. The coupling length $L_c$ (FIG. 1) of the active coupler 34 is set to be, e.g., less than about 1 cm, so as to cause a predetermined percentage, e.g., 25%, of the optical power of the mode 182 in the waveguide 94 to (passively) couple over to the mode 180 in the waveguide 96. As a result, 75% of the optical power of the mode 182 remains in the waveguide 94. Also, 25% optical power traveling in the waveguide 96 is (passively) coupled over to the waveguide 94, and 75% remains in the waveguide 96. This condition represents the aforementioned "cross" state of the coupler 34.

When a voltage is applied to the electrode 98 on the line 40, electric field lines 184 extend from the grounded electrode 99 downwardly through the mode 180 and upwardly through the mode 182 to the electrode 98. The electric field causes the effective index of refraction $n_{3eff}$ seen by the optical mode 180 to change in one direction and the effective index of refraction $n_{4eff}$ seen by the optical mode 182 to change in the opposite direction. Consequently, more of the optical power, e.g., 75%, is now coupled across the waveguides 94,98 and 25% remains in its respective waveguide, for the same length of the coupler $L_c$ (FIG. 1). Other voltage polarities may be used if desired. Also, other coplanar electrode configurations may be used if desired.

Referring now to FIG. 5, in general, the waveguide-integrated photodetector 72 has a structure and longitudinal cross-section similar to that shown in FIGS. 1 and 2 of the aforementioned copending patent application, and all the alternative embodiments discussed therein including other material compositions and concentrations.

The detector 72 has the same substrate 120, the same lower cladding layer 122, the same waveguide core 124, and the same upper cladding layer 126 as discussed hereinbefore with the rib waveguides of FIG. 2, the lateral modulator of FIG. 3, and the lateral coupler of FIG. 4.

Input light (either 62 or 92) as indicated generally by a line 190 from the coupler 34 travels along the waveguide core 124, strikes a retrograde angled surface 192, and reflects off it as a line 194 which is absorbed by a detector layer 196 and detected (or collected) by an electrode structure 198 as described in the aforementioned copending patent application. The metal electrode structure 198 and the GaAs detector layer 196 make up a Metal-Semiconductor-Metal (MSM) photodetector as is also described in the aforementioned copending patent application. Other means of detection may be used if desired, as discussed in the aforementioned copending patent application.

Referring now to FIGS. 6, 7, 8, 9, and 10 alternatively, instead of a semi-insulating substrate, the transceiver 8 may have an n+ doped substrate allowing a vertical electrode structure for the modulator 10 and the coupler 34.

Figure 6:
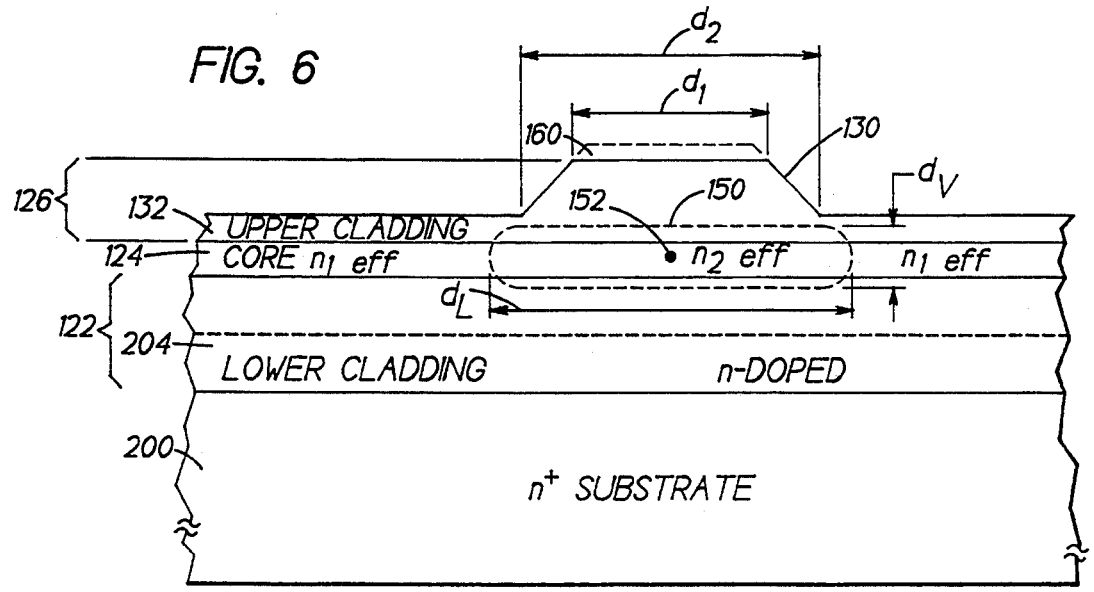
FIG. 6 is a lateral cross-section cut-away view of an alternative embodiment of the rib waveguide structure, in accordance with the present invention.

Referring now to FIG. 6, the passive rib waveguides 20,32,44,52,70 for the n+ substrate case are all made of a similar structure and with a similar design technique and criteria as that described in the aforementioned copending patent application. The passive rib waveguides comprise a substrate 200 made of heavily n-doped GaAs, i.e., n+-GaAs, having a thickness of about 500 microns, and having an n-dopant concentration of about $2 \times 10^{18}$ dopant atoms/cm$^3$. Other substrate materials may be used if desired.

Above the substrate 200 is the same lower cladding layer 122, the same waveguide core layer 124, and the same upper cladding layer 126 with the same mesa 130 and narrow portion 132, as the rib waveguide of FIG. 2, discussed hereinbefore. However, there is a region 204 within the lower cladding layer 122 which is n-doped (n-Al$_{0.25}$Ga$_{0.75}$As) having a thickness of about 6.3 microns and a dopant concentration of about $2 \times 10^{17}$ dopant atoms/cm$^3$. Also, the passive rib waveguides have the same optical mode 150 and the same lateral and vertical dimensions as the rib waveguide of FIG. 2, discussed hereinbefore.

Figure 7:
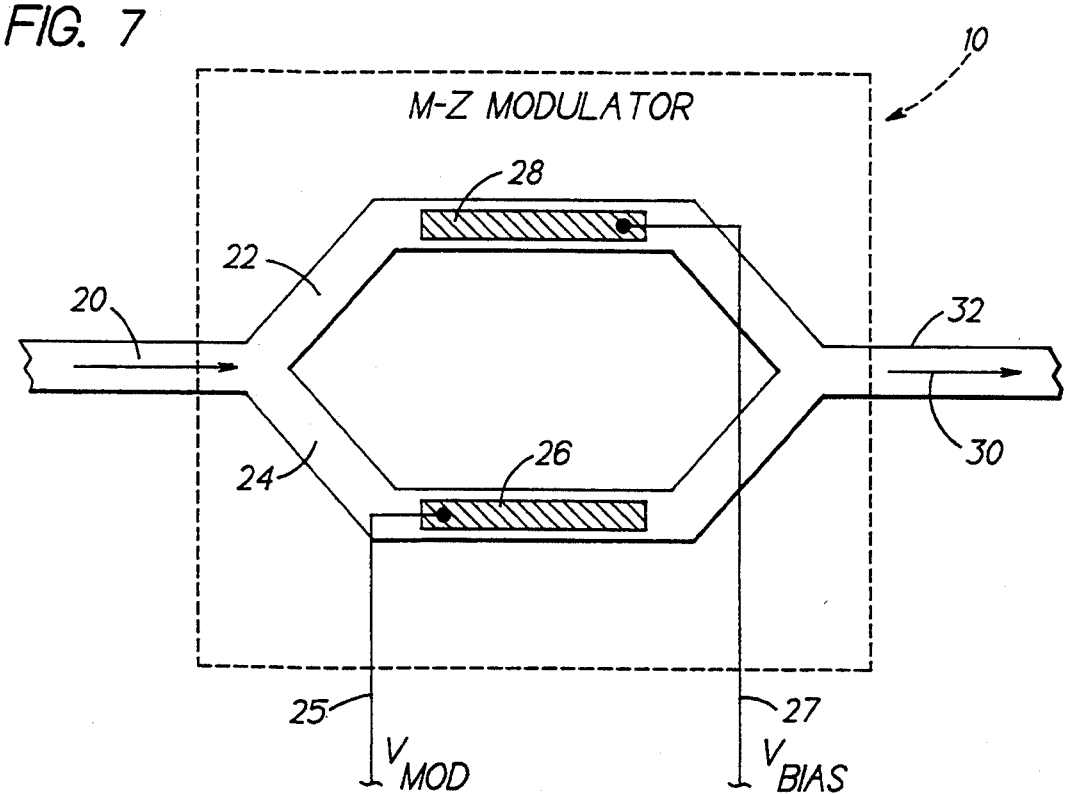
FIG. 7 is a top view of an alternative embodiment of the modulator, in accordance with the present invention.

Referring to FIG. 7, the modulator 10 with a vertical electrode structure has the electrodes 26,28 still on the upper surface, but the electrodes 29 of FIG. 1 are no longer on the upper surface of the modulator.

Referring to FIG. 8, also, the modulator 10 with a vertical electrode structure, has the same n+-substrate 200, the same lower cladding layer 122 with the same doped region 204, and the same waveguide core layer 124 as the rib waveguides of FIG. 2 discussed hereinbefore. Also, it has the same upper cladding layer 126 and spacing between the mesas 22,24 as the coplanar modulator of FIG. 3 discussed hereinbefore.

However, a portion 206 of the upper cladding layer 126 is p-doped having a concentration of $2 \times 10^{17}$ atoms/cm$^3$ and a thickness of about 0.9 microns. Further, layer 160 of NID GaAs (FIG. 3) is p-doped to provide a p-GaAs layer 208 having a thickness of about 0.2 microns, doped the same as the region 206 to provide a p-doped path from the electrodes 26,28 to the regions 206. Also, the dimensions of the optical modes 162,164 are unaffected by this doping arrangement.

The n-doped region 204 of the lower cladding layer 122 is grown in the epitaxial growth process of fabrication, and thus is located throughout the entire transceiver device (i.e., in all elements thereof). However, the p-doped regions are implanted in the desired locations after the device is grown, thereby allowing the p-doping to be done only in selected regions (e.g., not in the detector 72 or the passive waveguide sections).

The electrodes 26,28, are disposed on the upper surface of the straight portions (FIG. 1) of the arms 24,22 of the modulator, respectively. Also, an electrode 220 is disposed on the bottom surface of the substrate 200. The distance M1 between the mesa arms 22,24, is the same as for the coplanar case, i.e., about 40 microns.

The electrode 26 is driven by the modulation signal $V_{mod}$, on the line 13 from the modulation control circuit 12 which creates electric field lines 222 that extend vertically from the top of the n-doped region 204 through the optical mode 162 to the electrode 26. Similarly, the electrode 28 is driven by the bias signal $V_{bias}$, on the line 14 also from the modulation control circuit 12 which creates electric field lines 224 that extend vertically from the top of the n-doped region 204 through the optical mode 164 to the electrode 28.

As discussed hereinbefore with the coplanar electrode configuration, the electric field changes the index of refraction in a known way. For the vertical modulator, the change in index of refraction $\Delta$n seen by the optical modes 162,164 within the waveguides 24,22, respectfully, is proportional to electric field strength E=V/d; where V is the voltage applied to an electrode and d is the distance between the upper surface of the n-doped region 204 and the lower surface of the p-doped region 206. The n+ doped substrate and the n-doped region 204 of the lower cladding 122 provides a conductive path from the lower electrode 220 to the upper surface of the doped region 204. Similarly, the p-doped layer 208 and the p-doped region 206 of the upper cladding layer 126 provides a conductive path from the electrodes 26,28 to the lower surface of the doped region 206. This allows the distance d to be much smaller than the physical distance between the upper electrodes 26,28 and the lower electrode 220, thereby requiring a much lower voltage to produce a given electric field across the optical modes 162,164.

For the present invention, the distance d is 2 microns; however, other distances may be used if desired. Ideally, d should be small to maximize E for a given V applied. However, if d is too small the waveguide becomes lossy due to free-carrier optical loss caused by the interaction of light with the mobile charge carriers in the doped regions 204,206. Thus, d should be large enough to minimize such losses.

The half-wave voltage $V_\pi$ for the vertical configuration is about 6 volts. Thus, to provide modulation around 3 volts (or $V_\pi/2$), $V_{bias}=-4$ volts and $V_{mod}=-1$ volt dc $+/-0.5$ volts pk—pk modulation. Because the vertical structure is a p-i-n configuration, the peak-to-peak swing of $V_{mod}$ must not exceed a value that causes $V_{mod}$ to become positive, to avoid forward biasing the p-i-n junction. Thus, for the case where $V_{bias}=-4$ volts, $V_{mod}$ variation should be $<1$ Volt pk—pk. However, other values for $V_{bias}$ may be used to obtain a higher pk—pk voltage swing. In general, the value of the dc portion of the $V_{mod}$ is determined from the relation: $|V_{bias}-V_{dcmod}|=V_\pi/2$; where $V_{dcmod}$ is the dc component of $V_{mod}$.

Alternatively, instead of having the p-doped regions 206,208, a vertical modulator may be achieved by having these regions remain undoped (i.e., intrinsic or NID). In that case, a metal-semiconductor (Schottky) contact is formed by the metal electrodes 26,28. The intrinsic layers 124,126,208, and the n-doped layers 204,200 remain unchanged. The lack of the p-doped regions causes the distance d to be larger thereby requiring more voltage at the electrodes 26,28 to create a given electric field.

Figure 9:
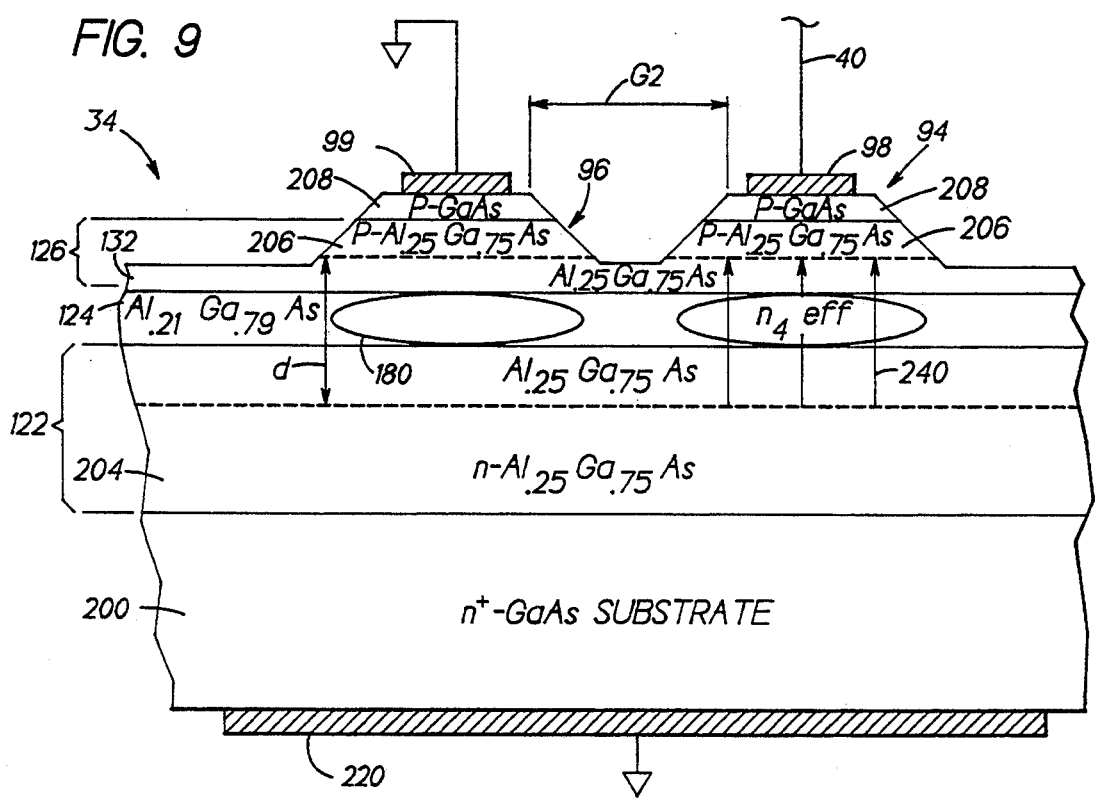
FIG. 9 is a lateral cross-section cut-away view of an alternative embodiment of the active coupler, having a vertical electrode configuration, in accordance with the present invention.

Referring now to FIG. 9, an active coupler with vertical electrode configuration has the same n+ substrate 200, the same lower cladding layer 122 with the same doped region 204, the same waveguide core 124, the same upper cladding layer 126 with the same doped region 206, and the same p-doped GaAs protection layer 208 as the vertical modulator of FIG. 8. Also, the spacing between the mesas 96,94 is the same as discussed hereinbefore with the lateral coupler of FIG. 4.

The electrodes 98,99 are located in the same place as the lateral coupler of FIG. 4; however, the electrode 220, discussed in FIG. 8 with the vertical modulator configuration, is also located under the substrate 200 for the vertical coupler and is connected to ground.

When no voltage (0 volts) is applied to the electrode 98, the spacing between the waveguides 96,94 is set so as to (passively) couple a predetermined amount of optical power, e.g., 25% between the optical modes 180,182 for a given coupler length $L_c$, as discussed hereinbefore.

When a predetermined voltage signal is applied to the electrode 98 on the line 40, electric field lines 240 extend vertically across the optical mode 182 from the upper surface of the n-doped portion of the region 204 to the lower surface of the p-doped region 206 of the layer 126. The electric field 240 causes the effective refractive index $n_{4eff}$ seen by the optical mode 182 to change. Consequently, more of the optical power, e.g., 75%, is now coupled across the waveguides 94,96 and 25% remains in its respective waveguide, for the same length of the coupler $L_c$ (FIG. 1). Other voltage polarities may be used if desired.

In this case, the electrode 99 is not required to provide coupling control, however it may add a small amount of additional electric field strength through the mode 182 thereby decreasing the amount of voltage required to provide a given amount of coupling. Without the electrode 99, the electric field strength across the optical mode 182 is equal to V/d where V is the voltage applied and d, e.g., 2 microns, is the spacing between upper surface of the region 204 and the lower surface of the region 206, the same as that discussed for the modulator 10 of FIG. 6.

Alternatively, it should be understood that a coplanar electrode configuration similar to that of FIG. 4 (for the semi-insulating substrate) may also be used for the coupler 34 when the substrate is n-doped.

Figure 10:
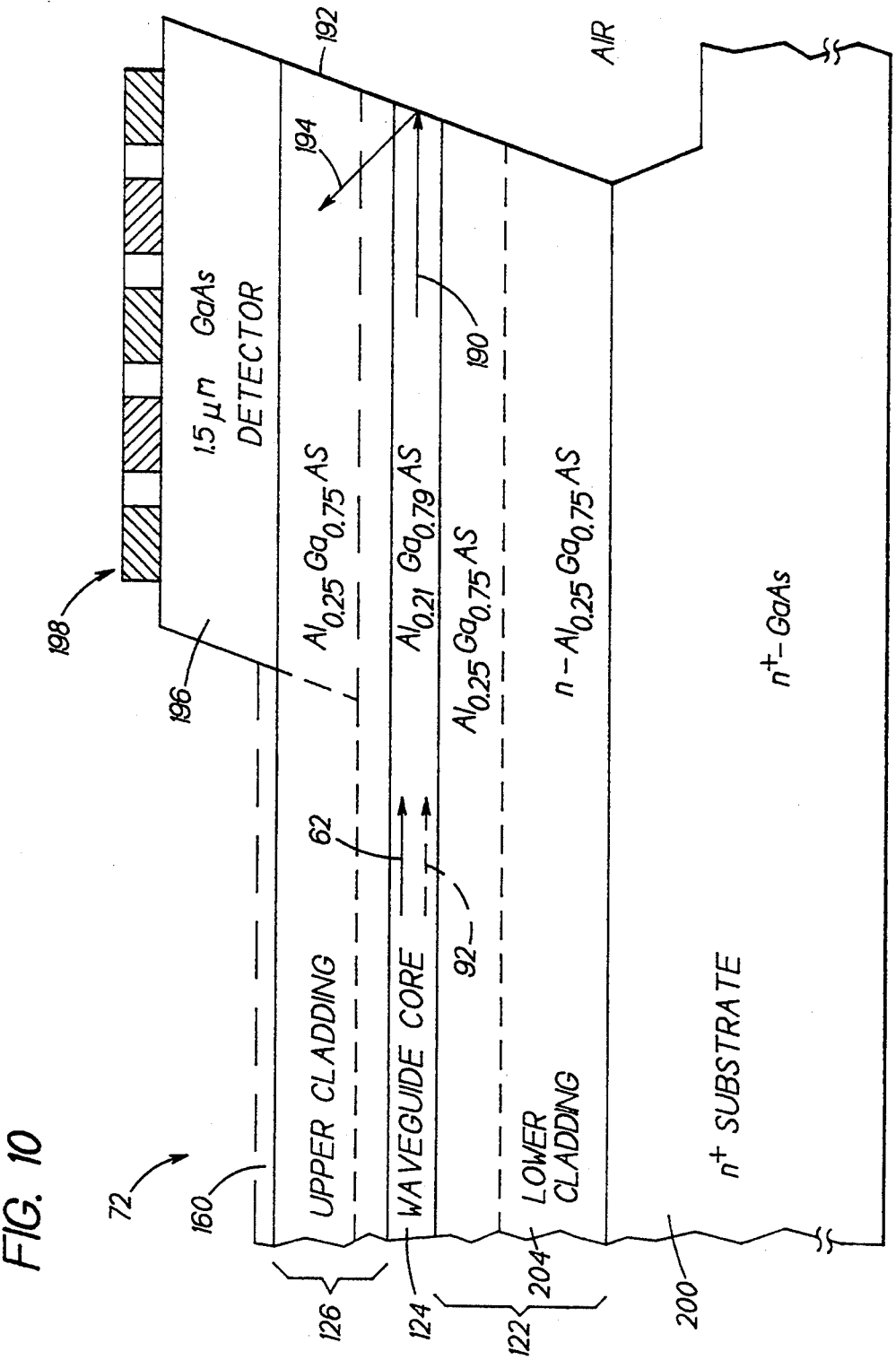
FIG. 10 is a longitudinal cross-section cut-away view of an alternative embodiment of the waveguide-integrated photodetector, in accordance with the present invention.

Referring to FIG. 10, in general, for the embodiment with the n+-substrate, the detector 72 has the same n+-substrate 200, the same lower cladding layer 122 with the same doped region 204, and the same waveguide core 124 as discussed with the rib waveguide of FIG. 6, the vertical modulator of FIG. 8, and the vertical coupler of FIG. 9. Also, it has the same upper cladding layer 126, the same detector layer 196, and the same detection means 198 as discussed hereinbefore with the detector 72 of FIG. 5. It should be noted that the upper cladding layer 126 has no p-doped region because it is not needed for the detector 72 and, as discussed hereinbefore, the p-doping is performed after epitaxial growth and deposited where needed.

Referring now to FIGS. 11 and 12, alternatively, instead of the coupler 34 being an active device, the invention may use a passive coupler which has no electrodes on the upper or lower surfaces. For the case where a semi-insulating substrate is used, the structure is as shown in FIG. 11 and the layers 120,122,124, 126,130,132 are the same as was discussed for the rib waveguide of FIG. 2. For the case where a doped substrate is used, the structure is shown in FIG. 9 and the layers 120,122,204,124,126,130,132 are the same as was discussed for the rib waveguide of FIG. 4. For both FIGS. 11 and 12, the two mesas 96,98 are spaced the same distance G2 as discussed with the lateral and vertical couplers of FIGS. 4 and 9, respectively.

For a passive coupler, the optical modes 180,182 are located close enough to allow a predetermined percentage of coupling between the two modes 180,182 continuously. This is caused by overlap between the optical fringes (not shown) of the modes 180,182 and the amount of overlap (and thus the amount of coupling) is determined by the effective refractive index seen by each mode, as discussed hereinbefore.

Figure 13:
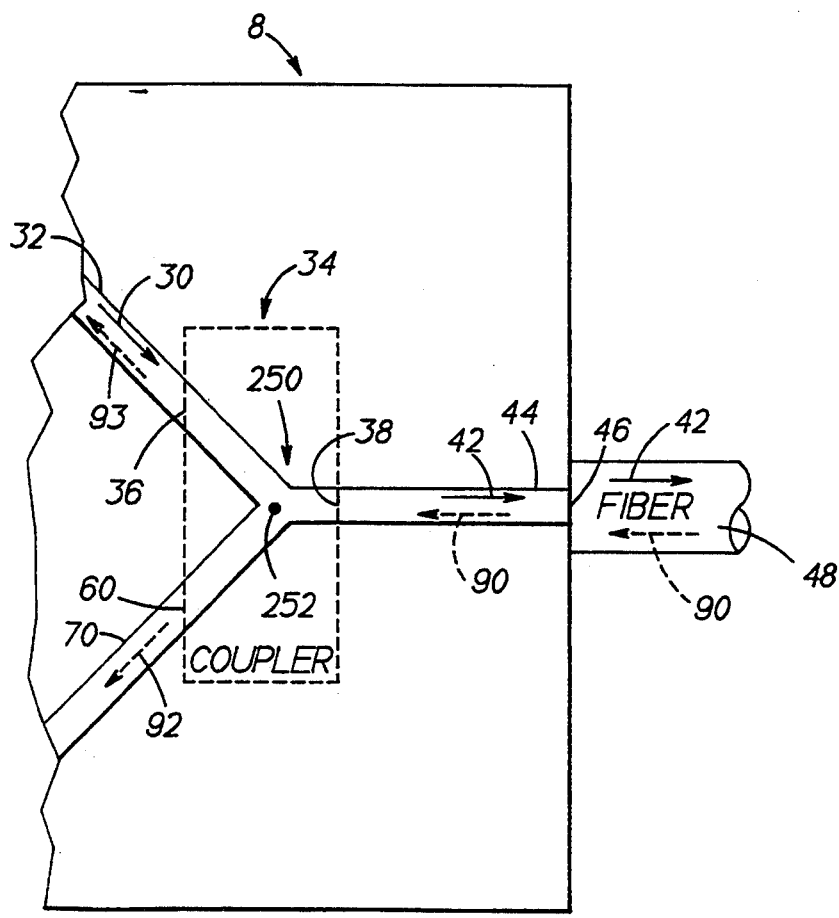
FIG. 13 is a top view of an alternative embodiment of the passive coupler employing a Y-junction, in accordance with the present invention.

Referring now to FIG. 13, if the coupler 34 is passive, a Y-junction 250 may alternatively be used. In that case, the waveguide 32 and the waveguide 70 are combined at a point 252 (similar to the output side of the modulator 10 (FIG. 1)), to form the waveguide 44 which connects to the fiber 48 (off the transceiver). The light 30 from the modulator 10 propagates along the waveguide 32 and enters the coupler 34 at the port 36. The coupler 34 couples about 50% of the light 30 to the port 38, which travels along the waveguide 44 as the transmit light 42. The remaining portion (50%) of the light 30 is lost due to radiation primarily into the substrate. The receive light 90 travels along the waveguide 44 to the port 38 of the coupler 34. The coupler 34 couples about 50% of the light 90 to the port 60, which travels along the waveguide 70 as the light 92 to the waveguide-integrated photodetector 72. The remaining portion (50%) of the light 90 is coupled to the port 36 which travels along the waveguide 32 as the light 93. Other coupling percentages may be used for the Y-coupler 250 by adjusting the angle between the waveguides 44,32,70.

It should be understood that the passive couplers described hereinbefore will work equally well with a semi-insulating or an n-doped substrate.

The major difference between the doped and semi-insulating (undoped) substrate configurations of the transceiver is that, with the semi-insulating substrate coplanar electrode configurations are needed for the modulator. In that case, the modulator requires more voltage to provide a given electric field across the optical modes. However, a main advantage of this configuration is high (broad) bandwidth for the modulator 10, e.g., 10–12 GHz, and for the photodetector 72, e.g., 8 GHz, (as discussed in the aforementioned copending patent application).

For the doped-substrate configuration, the modulator is more efficient in generating electric fields but the bandwidth of the modulator 10 is reduced to about 2 GHz (for lumped element) to 5 GHz (for travelling wave; discussed hereinafter) and the bandwidth of the photodetector 72 is about 5 GHz, due to capacitance between electrodes/bond pads and the doped substrate.

For modulation frequencies greater than about 2 GHz, the modulator electrodes 26,28 should be configured like a microwave transmission line (e.g., driving the modulation signal from one end of the electrode to the other), instead of a lumped element electrode (i.e., driving the modulation electrode in the center), because the capacitive effects will limit the bandwidth to about 2 GHz. When configured like a transmission line, the microwave electrical signal and optical wave (mode) co-propagate along the length $L_m$ of the modulator. To provide this effect, the modulation signal on the line 13 should be injected onto the electrode 26 at one end, as shown in FIG. 1.

Two phenomena occur at such high frequencies that limit the bandwidth of the modulator, as is known. The first is velocity (or phase) "walk-off" between the optical and electrical microwave signals. Velocity walk-off occurs when there is a difference between the propagation velocities of the optical mode in the waveguide and the microwave electric field near the electrodes. This velocity difference causes the modulation of the refractive index of the waveguide (caused by the microwave electric field) to be out of phase with the optical signal, thereby causing a reduced magnitude of net refractive index change, thus reducing the modulation effect.

The second limitation is microwave loss, i.e., attenuation of the magnitude of the modulation voltage signal as it propagates along the electrode 26. For a given frequency the magnitude of the electrical microwave signal decreases as a function of distance travelled along the electrode. As the modulation frequency gets higher, the rate of magnitude loss increases, thereby incurring the same amount of loss over a shorter travel distance.

When the vertical modulator structure is used (FIGS. 7,8), the n+-substrate and n-doped region 204 contain free carriers which cause both attenuation (microwave loss) and slowing (velocity walk-off) of the electric field as it propagates along the length $L_c$ of the coupler 34, thereby limiting the modulator bandwidth. However, in the coplanar modulator of FIG. 3, there is no n-doping; thus, minimal free carriers exist, thereby minimizing microwave loss and velocity walk-off and increasing the available bandwidth.

Also, the microwave loss may be further minimized by setting the characteristic impedance of the transmission line by sizing the gap G1 (FIG. 3) between the electrode 28 and the electrodes 29, the width W1, and the thickness of the electrodes. If the characteristic impedance is set to a predetermined value, e.g., 50 ohms, and the electrodes are terminated with the a resistor (not shown) of the same value, the power along the transmission line is maximized and reflections are minimized, as is known, and microwave loss is reduced.

The dimensions and concentrations of the layers described hereinbefore are optimized for light having a wavelength near 0.8 microns. However, it should be understood by those skilled in the art that other wavelengths of light may be used, such as 1.3–1.55 micron light common in long distance communication.

For 1.3–1.55 micron light, the composition of the upper and lower cladding layers 122,126 would be $Al_{0.1}Ga_{0.9}As$ and the core layer 124 would be GaAs (i.e., 0% Al), having a slightly thicker core layer 124 (e.g., 0.85–1.0 microns) than that described hereinbefore. Furthermore, the modulators and couplers would share this same basic structure as they did for the 0.8 micron light. Such a structure would then be doped as described hereinbefore if an n+-substrate was used.

Also, the detector 72 may have the detector layer 256 made of InGaAs to allow absorption of the light (as discussed in the aforementioned copending patent application).

Figure 14:
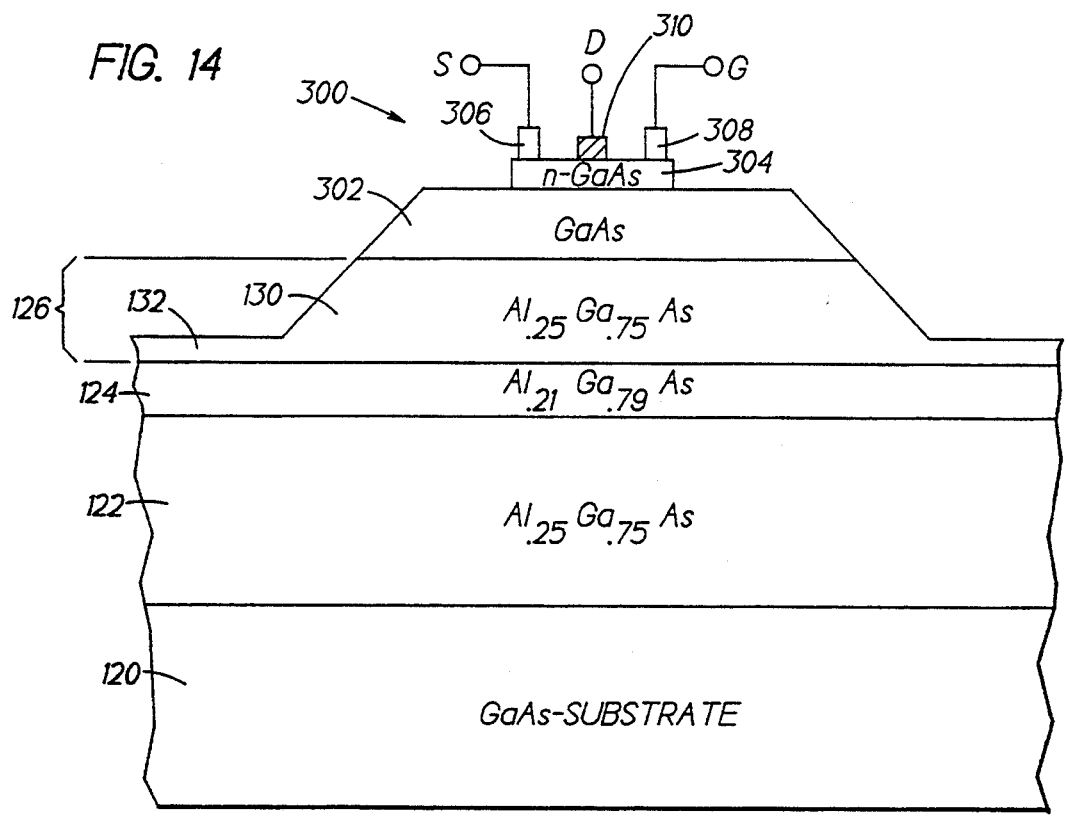
FIG. 14 is a lateral cross-section cut-away view of a field-effect-transistor (FET) on the transceiver of FIG. 1, in accordance with the present invention.
Figure 15:
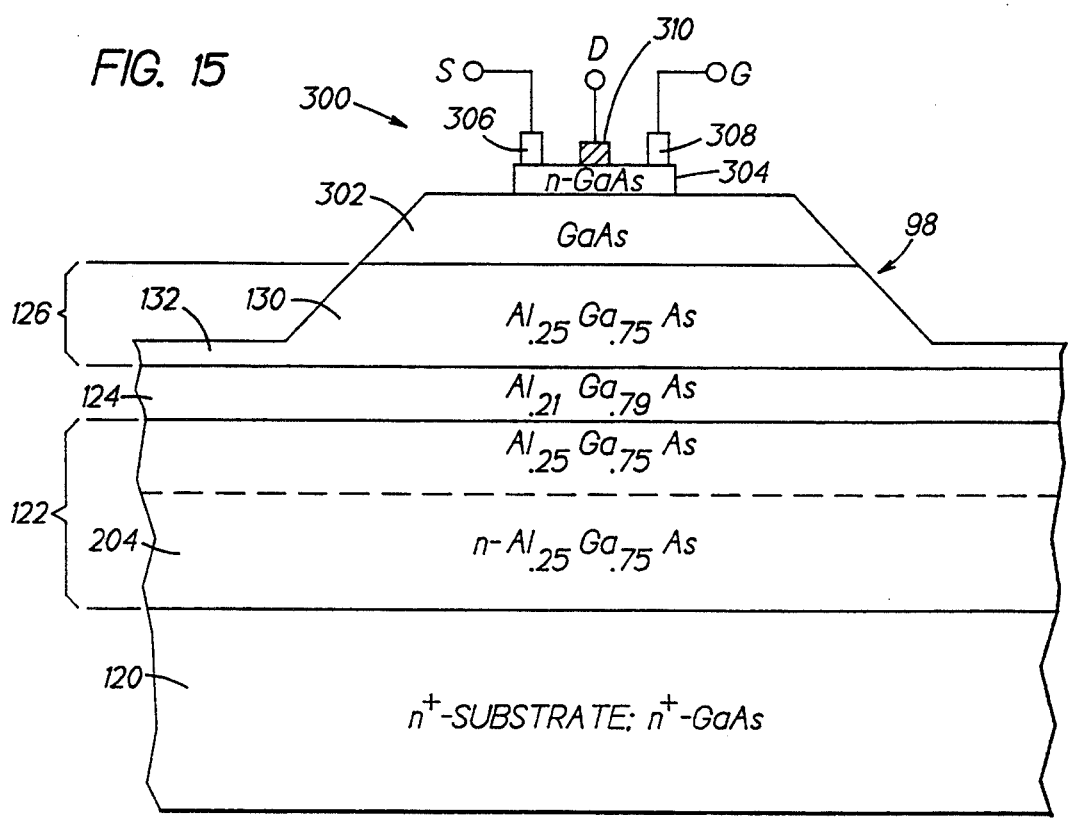
FIG. 15 is a lateral cross-section cut-away view of a field-effect-transistor (FET) on an alternative embodiment of the transceiver of FIG. 1, in accordance with the present invention.

Referring now to FIGS. 14, 15, for the semi-insulating and n+-substrate cases, respectively, because the transceiver is made from a III–V semiconductor substrate, it should be understood by those skilled in the art that field-effect transistors (FETs) such as metal semiconductor field-effect transistors (MESFETs) and modulation doped field-effect transistors (MODFETs) may be fabricated on the surface of the device. When MESFETs are used, the last layer grown is n-doped GaAs for the electronics. The n-GaAs is etched away in all areas except where the electronics are to be placed. Also, the lines 13,14,15,40,74,78 that connect electronics to the circuits 12,41,76 are patterned metal lines fabricated on the surface of the device and are commonly known in the art of integrated circuit fabrication. Other types of connect lines may be used if desired.

To form a MESFET 300, a mesa 302 of GaAs having a thickness of 1.5 microns is used to support the transistors. This is the same layer as the detector layer 256 (FIGS. 5,10). Above the mesa 302 is an etched mesa 304 of n-GaAs forming an n-channel for the MESFET 300, having a thickness of about 0.2–0.3 microns and a dopant concentration of $1 \times 10^{17}/cm^3$. Above the n-channel mesa 304 is a pair of ohmic contacts 306,308 made of a layered structure of Gold/Germanium/Nickel (Au/Ge/Ni) representing the drain and source, respectively, of the MESFET 300. Between the ohmic contacts 304,306 is a Schottky contact 310 representing the gate of the MESFET 300, made of a layered structure of Titanium/Platinum/Gold (Ti/Pt/Au), the same composition as the electrode structure 258 (FIGS. 5,10) on the upper surface of the GaAs detector layer 256 of the photodetector 72, as discussed in the aforementioned copending patent application.

The ability to fabricate FETs on the device allows for the design of a range of electronic circuits from simple switching and/or amplifying circuits to complex networks of logical decision making circuits, which may be fabricated on the transceiver chip.

The modulator control circuit 12, the receiver circuit 76, and the coupler control circuit 41 are fabricated on the surface of the device using FETs similar to the MESFET 300 of FIGS. 14,15. An example of such transistor circuit fabrication on a GaAs substrate is that described in U.S. Pat. No. 5,107,310, to Grudkowski et al, entitled "ACT Device With Buffer Channel"; and D. Rogers, "Monolithic Integration of a 3-GHz Detector/Preamplifier Using a Refractory-Gate, Ion-Implanted MESFET Process", IEEE Electron Device Letters, Vol. EDL-7, No. 11 (Nov 1986).

Examples of fabrication of FETs with waveguide-based devices on GaAs substrates include the articles: R. Ade et al, "Monolithic Integration of GaAs-Waveguide Optical Intensity Modulator with MESFET Drive Electronics", Electronics Letters, Vol. 28, No. 8, pp 702–703 (Apr. 9, 1992), showing integration of FETs with optical modulators; S. Mukherjee et al, "Monolithic Integration of Singlemode AlGaAs Optical Waveguides at 830 nm With GaAs E/D-MESFETs Using Planar Multifunctional Epistructure (PME) Approach" Electronics Letters, Vol 27, No. 24, pp 2281-2283 (Nov. 21, 1991), showing integration of FETs with optical waveguides; J. Abeles et al, "Integration of GaAs MESFET Drivers with GaAs Directional-Coupler Electro-optic Modulators", Electronics Letters, Vol. 23, No. 20, pp 1037-1038 (Sept 1987), showing integration of FETs with directional couplers.

To make an optical serial to parallel interface chip that behaves like a UART (Universal Asynchronous Receiver/Transmitter) or an RTI (Remote Terminal Interface), the modulator control circuit 12 (FIG. 1) accepts an 8 bit digital parallel input signal on the lines 15 (assuming the line 15 is a plurality of lines) from a microprocessor which it stores in a register and serially scrolls through the bits applying a first voltage signal on the line 13 (FIG. 1) for high (or "1") and a second voltage signal for a low (or "0") for each bit in the register.

Also, the receiver circuit 76 (FIG. 1) measures a current signal on the line 74 generated by the light incident on the photodetector 72. It converts the current into a voltage using known electronics and serially loads a register which is readable in a parallel fashion on the lines 78 (assuming the line 78 is a plurality of lines).

If the coupler 34 is a passive coupler (such as that described in FIGS. 11,12), the coupler control circuit 41 (FIG. 1) is not needed and a 50/50 coupling percentage is used to maximize receive and transmit power. Other coupling percentages may be used if desired. If the coupler 34 is an active coupler (such as that described in FIGS. 4,9), a timing circuit (not shown) containing known electronics may be designed in the coupler control circuit 41 which is synchronized with the serial bus communications and allows the modulator to transmit and the photodetector to receive at predetermined times.

Alternatively, the modulator control circuit 12 (and/or the receiver circuit 76) may send a signal on a line 320 to the coupler control circuit 41 telling it when to allow transmission and when to allow reception.

Alternatively, the transceiver 8 may be used to transmit analog modulated signals such as analog video signals. In that case, the modulator 10 (FIG. 1) receives an ac or dc signal on the line 15 and the modulator control circuit 12 provides an ac signal on the line 13 to cause the optical signal 30 to be amplitude modulated. Alternatively, the amplitude may be modulated at a frequency related to the value of the input signal (i.e., amplitude-frequency modulation).

In the case of amplitude (or amplitude-frequency) modulation, the receiver circuit 76 receives an amplitude (or amplitude-frequency) modulated optical signal, demodulates the signal using a known electronic demodulation circuit (not shown), and provides an output signal on the line 78 indicative of the demodulated signal.

Even though the invention has been described as having the electronics for the modulation control circuit 12, the coupler control circuit 41, and the receive circuit 76, all fabricated on the same substrate as the modulator 10, coupler 34, and photodetector 72, it should be understood that the electronics for such elements may be located off the chip itself.

Referring now to FIGS. 2,6,5,10,11,12, it should be understood that the layer 160 of GaAs described with respect to the active components of the modulator of FIG. 4 and coupler of FIG. 3, may also be located at the top of the mesas for the passive waveguides (FIGS. 2,6), the passive couplers (FIGS. 11,12), and the waveguide portion of the waveguide integrated photodetectors 72 (FIGS. 5,10). In that case, the etch process is simpler because it does not require a further etch step to remove the GaAs above these mesas after etching down to form the layer 160 for the active components.

Also, no power lines are shown feeding the transceiver; however, one skilled in the art will readily appreciate that such lines must exist for any electronic circuits to function.

Also, it should be understood that the transceiver may be made from an Indium Phosphide (InP) substrate, having the waveguide cladding and core layers 122,126,124 made of NID Indium Gallium Arsenide Phosphide (InGaAsP) and a detector layer of InGaAs, as described in the aforementioned copending patent application. Alternatively, the upper and lower cladding layers may be made of InP.

In the case of an InGaAs detector layer, the electronics (transistors) would likely be fabricated on the InGaAs layer. For a MESFET, above the InGaAs layer, the channel of the FET would be n-InGaAs, with a cap layer of Indium Aluminum Arsenide (InAlAs) beneath the gate electrode are attached. Alternatively, for a Heterojunction Bipolar Transistor (HBT) there would be a layered structure comprising n-InGaAs, p-InGaAs, n-InP, and n-InGaAs.

Further, it should be understood that the coupler need not be used. In that case, the transmit light would exit from the port 46 and the receive light would enter at the port 54. Also, the waveguides 32,94,44 would provide a conduit for the light 30 to exit the transceiver and the waveguides 52,96,70 would provide a separate conduit for the light 90 to enter the transceiver. In that case, a separate fiber would be used for transmit and receive light, i.e., there is not a single bidirectional communication line to the chip.

Also, the substrate 120 or 200 is not required for the invention to operate; thus, the waveguide structure and detector may be removed (or "floated off") from the substrate and bonded to another device or support structure if desired. Still further, any waveguide material, style, design, or shape may be used.

Also, instead of a Mach-Zehnder modulator, it should be understood that any type of electrooptic waveguide-modulator may be used if desired. For example, an active 4-port coupler, such as the coupler 34 shown in FIG. 1, may be used as the modulator 10 to provide the modulated signal 30. In that case, if one output port of the coupler is used as the output to the waveguide 32 (FIG. 1) and if one waveguide of the coupler is driven with a modulation voltage, the intensity of light at that output port is correspondingly modulated. Such a configuration may likely be used for the transmission of digital (on/off) optical signals from the modulator 10.

Also, other types of waveguide-modulators in general may be used, e.g., electro-absorption type optical modulators. In that case, the applied electric field alters the absorption band-edge of the material causing the material to absorb the light. Still further, instead of an electrical modulation signal driving the modulator 10 (FIG. 1) an optical modulation signal may be used.

Further, although a portion of the rib (or channel) waveguides have been described as having etched mesas, it should be understood that any type of rib (or channel) waveguide may be used provided it laterally and vertically confines the propagating light to the desired number of modes and the desired region of the device. For example, instead of etching mesas to confine the light, the light may be confined by doping regions around the desired waveguide channel, thereby changing the index of refraction enough to confine the light.

Although the invention has been described and illustrated with respect to the exemplary embodiments thereof, it should be understood by those skilled in the art that the foregoing and various other changes, omissions and additions may be made without departing from the spirit and scope of the invention.

We claim:

1. An integrated optical receiver/transmitter (transceiver), comprising:
   a substrate;
   modulator means, fabricated above said substrate, responsive to a modulation signal, for receiving input light, and for providing a modulated transmit light;
   a first waveguide fabricated above said substrate and connected to said modulator means for propagating said modulated transmit light;
   a second waveguide fabricated above said substrate and different from said first waveguide;
   photodetector means, fabricated above said substrate, connected to said second waveguide for detecting receive light propagating along said second integrated waveguide, and for providing a receive signal indicative of the intensity of said receive light.

2. The transceiver of claim 1 further comprising:
   a third waveguide fabricated above said substrate and different from said first and second waveguides;
   coupler means fabricated above said substrate connected to said first, said second and said third waveguides, for coupling a predetermined portion of said transmit light from said first waveguide to a third waveguide and for coupling a predetermined portion of said receive light from said third waveguide to said second waveguide.

3. The transceiver of claim 2:
   further comprising a fourth waveguide different from said first, second, and third waveguides, being connected to said coupler means; and
   wherein said coupler means couples a remaining portion of said transmit light from said first waveguide to said fourth waveguide as a built-in-test light, said built-in-test light then being coupled from said fourth waveguide to said second waveguide.

4. The transceiver of claim 2 wherein said coupler means comprises a passive coupler for constantly coupling said predetermined portion of said transmit light from said first waveguide to said third waveguide and for constantly coupling said predetermined portion of said receive light from said third waveguide to said second waveguide.

5. The transceiver of claim 4 wherein said coupler means comprises a Y-junction.

6. The transceiver of claim 2 wherein said coupler means comprises an active coupler responsive to a coupler control signal, for selectively coupling said predetermined portion of said transmit light from said first waveguide to said third waveguide and said predetermined portion of said receive light from said third waveguide to said second waveguide in response to a coupler control signal.

7. The transceiver of claim 6 wherein said active coupler comprises a coplanar electrode configuration.

8. The transceiver of claim 6 wherein said active coupler comprises a vertical electrode configuration.

9. The transceiver of claim 6 further comprising coupler control means fabricated above said substrate for providing said coupler signal.

10. The transceiver of claim 1 wherein said waveguide-modulator means comprises a Mach-Zehnder modulator.

11. The transceiver of claim 1 wherein said waveguide-modulator means comprises a coplanar electrode configuration.

12. The transceiver of claim 1 wherein said waveguide-modulator means comprises a vertical electrode configuration.

13. The transceiver of claim 1 further comprising modulator control circuit fabricated above said substrate for providing said modulation signal.

14. The transceiver of claim 1 wherein said waveguide-integrated photodetector means comprises a retrograde angled surface for reflecting said receive light.

15. The transceiver of claim 1 wherein said waveguide-integrated photodetector means comprises an MSM detector.

16. The transceiver of claim 1 further comprising a receiver circuit fabricated above said substrate responsive to said receive signal for providing a voltage signal related to said receive signal.

17. The transceiver of claim 1 further comprising a receiver circuit fabricated above said substrate, responsive to said receive signal, for demodulating said receive signal and for providing a signal related to the demodulated intensity of said receive light.

18. The transceiver of claim 1 wherein transistors are fabricated on a layer above said substrate to make up at least one control circuit.

19. The transceiver of claim 1 wherein said substrate comprises GaAs.

20. The transceiver of claim 1 wherein said substrate comprises n-doped GaAs.

21. The transceiver of claim 1 wherein said waveguide comprises a lower cladding layer, a core layer, and an upper cladding layer having an etched mesa below which an optical mode propagates, all fabricated above said substrate.

22. The transceiver of claim 21 wherein said lower cladding layer, said core layer, and said upper cladding layer comprises a predetermined thickness and concentration of AlGaAs.

23. An integrated optical receiver/transmitter (transceiver), comprising:
   modulator means, fabricated above said substrate, responsive to a modulation signal, for receiving input light, and for providing a modulated transmit light;
   a first waveguide fabricated above said substrate and connected to said modulator means for propagating said modulated transmit light;
   a second waveguide fabricated above said substrate and different from said first waveguide;
   photodetector means, fabricated above said substrate and connected to said second waveguide, for detecting receive light propagating along said second waveguide, and for providing an electrical receive signal indicative thereof; and
   coupler means, for coupling said transmit light from said first waveguide to a third waveguide and for coupling said receive light from said third waveguide to said second waveguide, thereby allowing bidirectional light to travel along said third waveguide.

24. The transceiver of claim 23 further comprising modulator control means for receiving electronic parallel digital input data signal and for providing said modulation signal indicative of a serial representation of said parallel digital input data signal.

25. The transceiver of claim 23 further comprising receiver means for converting said receive signal to a parallel digital output data signal indicative of the state of said receive signal over a predetermined period of time.

* * * * *